United States Patent [19]
Kaplan

[11] 3,726,175
[45] Apr. 10, 1973

[54] APPARATUS FOR INSTRUCTION OF STRINGED INSTRUMENT POSITIONING

[76] Inventor: Burton Kaplan, 817 West End Avenue, New York, N.Y. 10025

[22] Filed: Oct. 28, 1971

[21] Appl. No.: 193,412

[52] U.S. Cl. ...................84/470, 84/281, 84/465
[51] Int. Cl. ..............................................G09b 15/00
[58] Field of Search..............................84/281–283, 328, 453, 465, 467–470, 477; 200/DIG. 2, 61.47

[56] References Cited

UNITED STATES PATENTS

| 413,807 | 10/1889 | Loeser et al. | 84/281 |
| 1,343,595 | 6/1920 | Tiffany | 84/469 |
| 2,651,961 | 9/1953 | Heimers | 84/281 |

*Primary Examiner*—Richard B. Wilkinson
*Assistant Examiner*—John F. Gonzales
*Attorney*—Elmer R. Helferich et al.

[57] ABSTRACT

An attitude sensor is secured to a stringed instrument and an indicator responsive to the sensor provides indication to a student of each departure of the instrument from desired instrument positioning during play.

10 Claims, 3 Drawing Figures

PATENTED APR 10 1973　　　　　　　　　　　　　　3,726,175
FIG. 1
FIG. 2
FIG. 3
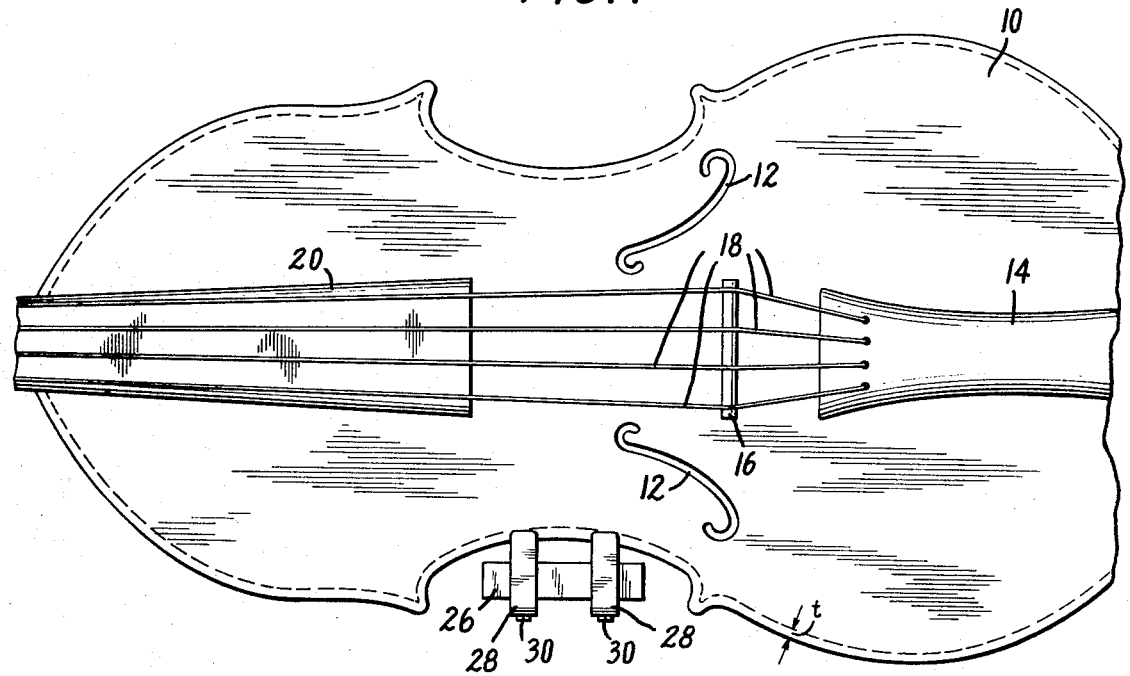
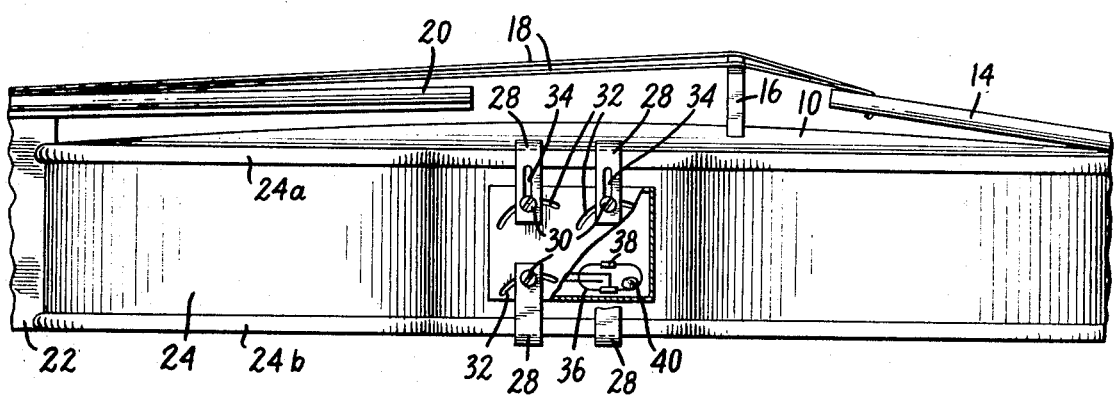
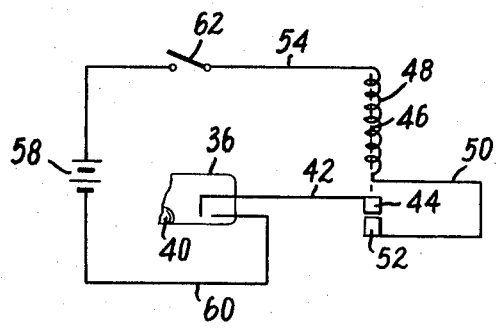

APPARATUS FOR INSTRUCTION OF STRINGED INSTRUMENT POSITIONING

FIELD OF THE INVENTION

This invention pertains to music education and more particularly to methods and apparatus for instructing students in the art of playing stringed instruments.

BACKGROUND OF THE INVENTION

Violin teachers are in general agreement as to certain basic student-instrument interrelationships, e.g., the proper positioning of the violin during play. Thus, all typically instruct that the instrument be held in substantially horizontal position by the collar-bone and jaw-bone with some assist from the shoulder and string-fingering hand, the top of the violin being inclined slightly so as to face the listener. The neck of the instrument is disposed between the proximal phalanx of the forefinger and the thumb of the string-fingering hand. While the student, whether beginning or remedial, readily positions the violin initially in such desired manner, he characteristically permits the instrument to depart from its proper position during playing. By the term playing, I include private practice, concert, rehearsal or practice at a lesson.

Oral instructional efforts customarily undertaken to influence the student in the continuation of such proper positioning of the violin during his playing of the instrument are less effective than is desired, and are effective to such extent only during practice at a lesson. Whereas deficiencies in tonal reproduction may indicate improper instrument positioning to the skilled artist, such deficiencies do not so inform the beginning student and, accordingly, are not a source of corrective influence.

Violin instructional devices in the nature of harnesses effective to constrain a student to desired positions as shown, e.g., in U.S. Pats. No. 1,906,584 and No. 2,240,696, are not seen as providing any such corrective influence. These devices are effectively crutches providing unnatural assistance not likely to continue their limited effectiveness when dispensed with. Furthermore, during use thereof, these devices prevent experimentation by the student, thereby eliminating the possibility of error on his part. Evidently, these devices cannot assist the student in developing a sense of guidance independent of the devices.

SUMMARY OF THE INVENTION

I have observed that the attention of the stringed instrument student is diluted by the variables he is required to control to such an extent that the attention he in fact directs to any particular variable, e.g., instrument positioning, is inadequate. Accordingly, I have concluded that instructional method and apparatus likely to provide improved corrective influence must have the effect of focusing the attention of the student on distinct variables and develop in him an independent sense of guidance. Such method and apparatus are the primary objects of this invention.

It is an additional object of this invention to provide instructional method and apparatus for use in private practice independently of an instructor.

A further object of the invention is to provide instructional apparatus which interferes minimally with the freedom of movement of the student.

In the attainment of the foregoing and other objects, the invention provides apparatus, including attitude-sensitive signal generating means secured to the instrument, effective on predetermined deviation from proper instrument positioning to direct the student's attention to his manner of positioning the instrument. In accordance with the method of the invention, such apparatus is provided and secured to the instrument.

The foregoing and other objects and features of the invention will be evident from the following detailed description thereof and from the drawings.

BRIEF DESCRIPTION OF THE DRAWINGS

FIG. 1 is a plan view of a violin equipped in accordance with the invention.

FIG. 2 is a side elevational view of the arrangement of FIG. 1 broken away in part to show detail.

FIG. 3 is a schematic diagram of a circuit suitable for use in the apparatus of FIG. 1.

DETAILED DESCRIPTION OF THE PREFERRED EMBODIMENTS

FIGS. 1 and 2 depict a violin of standard construction comprising a top 10 defining F-holes 12 and supporting tail piece 14 and bridge 16. Strings 18 are stretched across finger-board 20 supported by neck 22 over the bridge and are secured to the tail piece. The violin back (not shown) is spaced from top 10 by ribs 24 which define upper and lower rounded contours 24a and 24b. As shown in FIG. 1, the contours are of predetermined thickness t and are widely recognized as elements of the violin having substantially non-vibratory surfaces.

An accessory device provided by the invention for use in conjunction with the described violin includes a housing 26 and L-shaped members 28 connected to housing 26 for securing the same to the violin. For purposes discussed below, members 28 are secured to the housing in such manner that some variation in the orientation of the housing to the violin may be accommodated. Exemplary structure for this purpose is shown in FIG. 2 and comprises screws 30 which pass through members 28 and engage arcuate slots 32 provided in the forward wall of the housing. Members 28 may themselves be equipped with vertical slots 34 to accommodate variations in rib dimensions.

In securing housing 26 to the violin, members 28 preferably engage non-vibratory surfaces thereof, e.g., engage contours 24a and 24b such that the accessory device does not interfere with tonal reproduction. In the course of such securement, screws 30 are loosened and members 28 are expanded sufficiently to extend beyond contours 24a and 24b. Upon positioning of members 28 securely on contours 24a and 24b, and upon desired adjustment of the angulation between housing 26 and the violin, the screws are tightened.

The electrical circuit elements of FIG. 3 may be supported interiorly of housing 26 with attitude or tilt-sensing switch element 36 secured to the housing rearward wall by clip 38. This element may typically comprise a mercury switch and, on movement of the violin in counterclockwise fashion from its FIG. 2 position, the mercury globule 40 will bridge the switch contacts.

Referring to FIG. 3, one contact of switch element 36 is connected by line 42 to a contact member 44 resiliently supported in housing 26 and connected to the armature 46 of electromagnetic coil 48. One terminal of the coil is connected by line 50 to a second contact member 52 fixedly supported in housing 26 in position engaging contact member 44 when coil 48 is unenergized. The remaining terminal of coil 48 is connected by line 54 to one terminal of a battery 58 and the remaining battery terminal is connected by line 60 to the second contact of switch 36. The circuit of FIG. 3 will be recognized as a conventional buzzer type annunciator in association with switch 36. In operation thereof, when the contacts of switch 36 are bridged by globule 40, coil 48 is energized by battery 58 and thereupon displaces armature 46 such that contact member 44 is removed from contact member 52 with consequent deenergization of the coil. As the contact members are thereupon re-engaged, the coil is reenergized. This activity is cyclic throughout periods of closure of switch 36 and gives rise to desirable sustained audible output. Where desired, a switch 62 may be introduced in the circuit of FIG. 3 so as to provide for the disabling of the buzzer at the option of the student or teacher. Housing 26 may incorporate an actuator for such switch 62 conveniently disposed exteriorly of the housing. By this arrangement, the accessory apparatus may be maintained fixed to the violin and may be readily silenced during periods of verbal instruction or of transporting the violin.

The methods of the invention, whereby the attention priorities of the student are conformed to the interests of the teacher, involve the steps of providing the accessory apparatus and equipping the instrument therewith. Preferably, the method is practiced by providing the apparatus, determining the proper positioning of the instrument for a given student and equipping the instrument with the accessory apparatus in such manner as to insure that an indication is provided to the student on each occurrence of his positioning of the instrument in improper position. Evidently, a limited range of proper positioning exists and may vary somewhat from teacher to teacher. The tilt-sensitive switch means of the accessory apparatus may be readily selected to provide for inactivity of the apparatus in such range and the variable positioning elements of the apparatus, e.g., slots 32 and screws 30, readily accommodate the adjustment of the orientation of the tilt-sensitive switch element relative to the violin into an initial position within such range.

In the use of the apparatus and method of the invention, it has been observed that the average student is instructed as respects his proper positioning of the violin in relatively short order and thereafter plays without energizing the accessory apparatus, despite that the same is active and prepared to provide indications of deviation from proper positioning. It has been observed further that on the removal of the accessory apparatus after limited use thereof, the student exhibits a mature habit of consistently maintaining proper instrument positioning, evidence of his development of an independent sense of guidance.

While discussion to this juncture has related to the methods and apparatus of the invention as applied to proper positioning of the stringed instrument in respect of its attitude relative to an axis extending substantially longitudinally through the instrument, the invention is of course equally applicable to providing corrective influence for deviation from proper instrument positioning relative to any axis, e.g., an axis transverse to the instrument strings, by appropriate disposition of the tilt-sensitive switch. In addition, the invention contemplates indicating to the student his instrument positioning deviations of both polarities, e.g., up or down, relative to the desired axis. In the embodiment of FIG. 2, the positions of switch 36 contacts and globule 40 may be interchanged to sense clockwise movement of the instrument. Bipolar movements may be sensed concurrently by use of multiple switches or a single multi-contact switch.

While the apparatus and method of the invention have been described by way of a particularly preferred embodiment thereof, numerous changes in the described apparatus will be readily evident to those skilled in the art. Thus, for example, the tilt-sensitive switch element may comprise a pendulous gravity-responsive switch or the like. The switch may be mounted directly on the stringed instrument or may be mounted for variable positioning within the housing therefor rather than in the above-described arrangement wherein the housing itself is mounted for adjustable positioning relative to the instrument. In the latter instance, the housing may be secured to the non-contoured, i.e., vertical portions of the ribs, to the scroll, etc., in fixed manner.

For securing the accessory apparatus to the instrument, the standard chin rest clamp may be readily employed. Furthermore, the electromechanical buzzer described above may be substituted for by a host of indicators, e.g., piezoelectric annunciators, etc. The tilt-sensitive switch element may be arranged separately in the housing secured to the instrument and the cooperative circuit elements of FIG. 3 may be contained in a further assembly secured to the body of the student. The embodiment particularly disclosed is thus intended in a descriptive and not in a limiting sense. The true spirit and scope of the invention is defined in the following claims.

What is claimed is:

1. In combination, a stringed instrument, first means for indicating predetermined positioning of said instrument and second means connected to said first means for securing said first means to said instrument, said first means comprising:
   a. a voltage source;
   b. attitude-sensitive switch means; and
   c. indicator means connected to said voltage source by said switch means, said switch means being rendered conductive on occurrence of said predetermined positioning of said instrument, said voltage source thereupon energizing said indicator means to indicate said predetermined instrument positioning.

2. The invention claimed in claim 1 including a housing for containment of said first means, said switch means being fixedly supported in said housing, said second means being connected to said housing by means providing for variation in the orientation of the securement of said first means to said instrument.

3. The invention claimed in claim 1 wherein said instrument is a violin, said second means providing securement of said first means to non-vibratory surfaces of said violin.

4. The invention claimed in claim 2 wherein said instrument is a violin, said second means providing securement of said first means to non-vibratory surfaces of said violin.

5. The invention claimed in claim 1 wherein said indicator means comprises an electromechanical buzzer.

6. The invention claimed in claim 5 wherein said switch means comprises a mercury switch.

7. A method for teaching a student to maintain a stringed instrument in a predetermined position during the playing thereof including the step of equipping the instrument with apparatus both permitting him to change the position of said instrument and providing an indication to him upon each occurrence of his positioning of the instrument in a position having preselected relation to said predetermined position.

8. The method claimed in claim 7 wherein said apparatus provides an audible indication on each said occurrence.

9. The method claimed in claim 7 wherein said step of equipping the instrument is practiced by affixing said apparatus to a non-vibratory surface of said instrument.

10. A method for teaching a student to maintain proper positioning of a stringed instrument during the playing thereof including the steps of:
  a. determining a range of proper positioning of the instrument for the student;
  b. providing a voltage source, indicator means and attitude-sensitive switch means connected to said source and to said indicator means for detecting instrument positioning having predetermined relation to said proper positioning range and thereupon connecting said indicator means to said voltage source; and
  c. securing at least said switch means to said instrument.

* * * * *